United States Patent [19]
White

[11] Patent Number: 4,630,257
[45] Date of Patent: Dec. 16, 1986

[54] DUPLEX SPEECH TRANSMISSION METHOD AND A SYSTEM THEREFOR

[75] Inventor: Philip D. White, Woking, England

[73] Assignee: U. S. Philips Corporation, New York, N.Y.

[21] Appl. No.: 678,732

[22] Filed: Dec. 6, 1984

[30] Foreign Application Priority Data

Dec. 9, 1983 [GB] United Kingdom ................. 8332951

[51] Int. Cl.⁴ .............................................. H04J 3/00
[52] U.S. Cl. ........................................ 370/29; 370/83; 370/109
[58] Field of Search ..................... 370/29, 109, 83, 118

[56] References Cited

U.S. PATENT DOCUMENTS 4,071,707 1/1978 Graf et al. ........................... 370/118

FOREIGN PATENT DOCUMENTS 1440047 6/1976 United Kingdom ................. 370/29

OTHER PUBLICATIONS

Akerberg, Equipment for Wireless Telephone Transmission 2/2/84, International Application published under the PCT, Stockholm (SE).

Primary Examiner—Robert L. Griffin
Assistant Examiner—M. Huseman
Attorney, Agent, or Firm—Thomas A. Briody; William J. Streeter; Leroy Eason

[57] ABSTRACT

A duplex speech transmission method is disclosed wherein a limited bandwidth transmission channel is divided in a plurality of successive time slots, alternate time slots being available for each of two parties to call in Speech signals from either of the parties are divided into time segments with the time segments associated with one of said two parties being offset in time with the time segments associated with the other of said two parties. Segments of speech when present are digitised and stored in digital form. A higher rate of quantization is used when speech is present in the segments of one party and not in those of the other party, said higher rate quantized signal being transmitted in the other party's time slot and the immediately following time slot of said one party. A lower rate of quantization is used if both parties have speech in their respective segments, the lower rate quantized signals being time compressed and transmitted in their associated time slots. By the method being digited throughout the end of a segment coincides substantially with the end of the time slot associated with said segment and thus a delay not exceeding half a segment is incurred. By making the segments have a duration of 2 ms then the method complies with PSTN requirements.

8 Claims, 5 Drawing Figures

4,630,257

DUPLEX SPEECH TRANSMISSION METHOD AND A SYSTEM THEREFOR

BACKGROUND OF THE INVENTION

1. Field of the Invention

The present invention relates to a duplex speech transmission method and a system therefor. The present invention has particular, but not exclusive, application to demand-assigned time division duplex speech transmission systems which may be used in cordless telephone systems.

2. Description of the Related Art

Time division speech duplex systems are known; see, for example, the article by Henry, P. S. and Glance, B. S. "A new approach to high capacity digital mobile radio". Bell System Technical Journal, October 1981, pp 1891 to 1904. The mode of operation of one such system is illustrated in FIG. 1 of the accompanying drawings. For the sake of illustration it will be assumed that there is a base station having a transceiver capable of duplex operation and a handset having a similar type of transceiver. Speech emanating from the handset and the base station is split into time segments 12, the base station speech signal being shown in the diagram referenced 1(i). As the time period on the communication channel has to be used for transmission from both transceivers or either one of them, then in order to do this the segments 12 of speech are time-compressed, usually digitally, by a factor of 2 and transmitted as a time division duplex signal. This is illustrated in diagram 1(ii) wherein alternate slots 14 relate to transmission from the handset (H) to the base station (B) and the intervening slots 16 to transmissions from the base station to the handset. The cross-hatched portions 18 between the slots 14, 16 are guard-bands to allow time for the radio equipment to switch from transmit to receive and vice versa. At the handset, diagram 1(iii), the time-compressed base station speech is re-expanded to fill a time segment 19 of the same length as the segment 12. Although not shown, a similar expansion of the handset speech takes place at the base station.

In time division duplex systems applied to telephone systems it has been found that during a typical call each party speaks for less than 50% of the time. Accordingly, to allocate time slots in this way is clearly a waste of available capacity in a transmission channel if there is no information to be transmitted.

A duplex voice communication system is known from British Patent Specification No. 1440047 in which segments of speech are first stored alternately in analogue stores and subsequently the stores are read-out alternately and the segment of speech being read-out is then quantised at a high or low rate depending on whether one or both parties originating the speech want to transmit simultaneously. The quantised speech is then transmitted on a limited bandwidth channel in one of a plurality of successive time slots of 50 milliseconds (mS) duration. In all two time slots (100 mS) are required to complete the transmission of a segment of speech. Such a system is not suitable in cordless telephone systems for use on the Public Switched Telephone Network (PSTN), which only permits delays of the order of 1 mS, requiring 2 mS time slots. It is estimated that to adapt the known system for use on the PSTN would be impractical because the signalling overheads relative to the digitised speech would be too great. Furthermore the use of analogue and digital circuitry mitigates against fabrication as an integrated circuit.

SUMMARY OF THE INVENTION

An object of the present invention is to provide a duplex speech transmission method which complies with the requirements of the PSTN and utilises a limited bandwidth channel effectively.

According to the present invention there is provided a duplex speech transmission method wherein a limited bandwidth transmission channel is divided into time slots, alternate time slots being available for each of the two parties to call in. Segments of speech are digitised and stored at a higher mean bit rate if only one party is speaking at any instant, the higher mean bit rate digitised speech being transmitted within the duration of two successive time slots, and wherein segments of speech are digitised and stored at a lower mean bit rate if both parties are speaking. Packets of the digitised speech from both parties are time-compressed and applied to the transmission channel during respective alternate time slots.

The present invention also provides a duplex speech transmission method wherein a limited bandwidth transmission channel is divided into a plurality of successive time slots, alternate time slots being available for each of two parties to call in. Speech signals from each of the parties are divided into time segments, the time segments associated with one of said two parties being offset in time with respect to the time segments associated with the other of said two parties. Segments of speech, when present, are digitised and stored, a higher rate of quantisation being used when speech is present in the segments of one party but not in those of the other party. The higher rate quantised signal is transmitted in the other party's time slot and the immediately following time slot of the first party, and a lower rate of quantisation is used if both parties have speech in their respective segments. The lower rate quantised signals are time compressed and transmitted in their associated time slots, the end of a segment coinciding substantially with the end of the time slot associated with said segment.

The present invention further provides a duplex communication system for use on a limited bandwidth transmission channel divided into a succession of time slots, alternate time slots being allocated to each of two parties for transmission, wherein each party has an apparatus comprising means for detecting if speech is to be transmitted by that apparatus in a time slot allocated to said apparatus and for signalling accordingly to the other apparatus, means for digitising and storing a segment of speech, and means for determining if the other party has signalled that it has a segment of speech to transmit in its time slot. Upon determining that only one of the apparatus wants to transmit, the digitising means is controlled to digitise its segment of speech at a higher mean bit rate and to transmit it in two successive timeslots. If it is determined that both parties have speech for simultaneous transmission, the digitising means is controlled to digitize the segments of speech at a lower mean bit rate. The apparatus also comprises means for time-compressing the speech digitised at the lower mean bit rate and transmitting the said digitised signal in packets in their respective time slots.

In the case of applying the present invention to a cordless telephone system, it is possible that the mean data rate for digitising speech will be 32 kbits/second.

Such a data rate is barely adequate for acceptable speech transmission over telephone links and some degradation of quality is apparent to the user. To reduce the perceptible effects of this degradation it is proposed, in the case of a single person talking, to digitise the speech at a much higher data rate, say 64 kbits/second, which would minimally degrade the speech. However, when both parties are calling a lower data rate is used and each party's speech segment is time-compressed by a factor of 2 and applied in alternate slots with the other party's time-compressed speech to the limited bandwidth transmission channel. When both parties are talking simultaneously the degradation in speech quality will hardly be perceptible.

In order for the system to determine if a party is speaking in his/her segment a speech detector may be provided so that in a short signalling slot or interval an indication can be given as to which of the mean bit rates is to be used and whether time-compression and interleaving of the time-compressed slots is required. Because time for additional signalling on the transmission channel has to be allowed for, then slight time-compression of the signal at the higher mean bit rate may be necessary.

Adaptive delta modulation or adaptive differential PCM may be used to digitise the speech, either of which method has the advantages that the normal transmission speed may be twice as high and that one can switch substantially instantaneously between the higher and lower mean bit rates.

BRIEF DESCRIPTION OF THE DRAWINGS

The present invention will now be described, by way of example, with reference to FIGS. 2 to 4 of the accompany drawings, wherein:

Referring to FIG. 2, it will be assumed that the limited bandwidth transmission channel is able to handle a maximum signalling rate of the order of 70 kbits/sec. Such a transmission channel may comprise a radio, infra-red or a cable link. Base station speech, see diagram 2(i), is divided up into segments having a duration of 2 milliseconds (ms). Likewise the handset speech signal is divided up into segments of 2 ms duration, the segments being offset by 1 ms relative to those of the base station signal, see diagram 2(iii), so that the transmission of either signal terminates at an instant corresponding to the end of its associated segment. Diagram 2(ii) represents the information format on the transmission channel.

Figure 1:
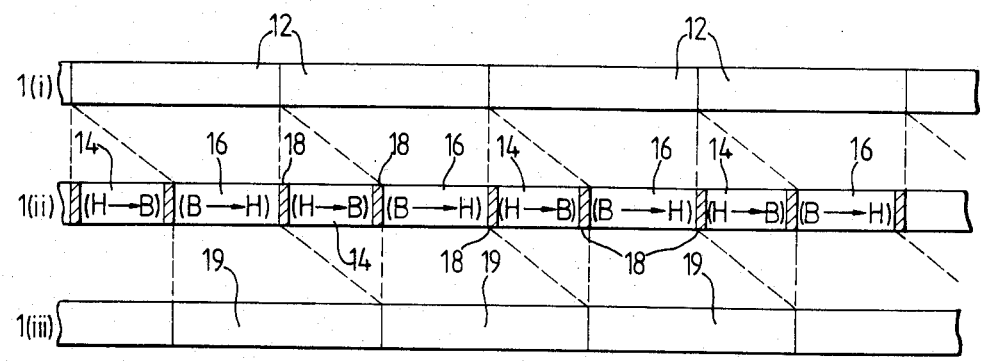

Both speech signals are digitised before transmission by means of a technique such as adaptive delta modulation or adaptive differential PCM. Such modulation techniques are able to switch from one mean bit rate to another mean bit rate and back again substantially instantaneously. The particular mean bit rate which is used at any particular time depends on whether one party or both parties wish to talk simultaneously. In accordance with the present invention when both parties are speaking simultaneously then each 2 ms time segment on the channel has to contain both segments of speech. To do this each channel time segment comprises two slots, each of 1 ms. One slot in each channel segment is devoted to each party and the speech is digitised at a low rate of 32 kbits per second and the digitised signal is time-compressed and transmitted in 1 ms slots at a rate of 64 kbits per second. This is illustrated by the segment 20 of the base station signal (diagram 2(i) segment 21 of the handset signal (diagram 2(iii)) and the segment 22 of the transmission channel (diagram 2(ii)). The handset to base (H→B) signal precedes the base to handset (B→H) signal because of the 1 ms offset between the segments. At the receiver section of the base station and handset the time-compressed signals are expanded to their original width and converted to analogue signals for reproduction. Speech digitised at 32 kbits/sec. would not normally be particularly acceptable because of the loss of fidelity. However as both parties are talking simultaneously then the loss of fidelity will be unnoticed. However the situation is different if only one party is talking.

In the example illustrated, it will now be assumed that there is still a speech signal from the base station, as in segments 24 and 26 in diagram 2(i), but nothing from the handset. Consequently, because only one party wants to use the transmission channel which is capable of transmitting at a bit rate of 70 kbits/sec. then it is possible to send the signal with a higher fidelity. To that end, the base station adaptive modulator is switched to digitise the speech signal at a rate of 64 kbits/sec. This signal is time-compressed slightly and transmitted in the slot 28. As will be explained, slight time-compression is necessary because of having to allow channel time for additional signalling. At the receiver in the handset the signal is expanded and demodulated in a suitably adapted demodulator.

Figure 2:
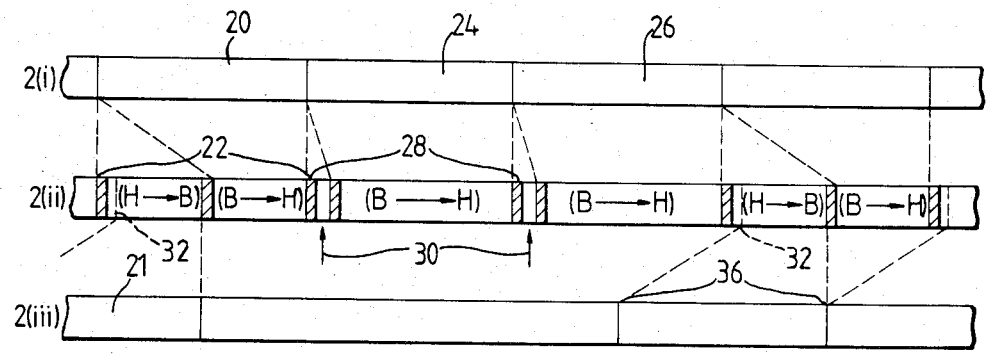
FIG. 2 illustrates the speech time segments and information format in a time division duplex transmission system in accordance with the present invention.

For signalling purposes a small amount of time, say 5%, is allocated regularly, for example at the beginning of each slot, for the base station and handset to indicate if either one is sending valid speech and therefore wants its slot. The digitising rate of the transmitting party will depend on such signalling and the demodulating rate of the receiving party. A simple form of signalling is to send, say, a logical 1 if a party has valid speech to send and a logical 0 if he has no valid speech. This latter condition is indicated by arrows 30 in diagram 2(ii) and the former condition by the broken lines 32. Thus in a typical situation as illustrated in FIG. 2, the person at the handset may not actually be speaking and the person at the base station is actually speaking and in consequence only the base station has valid speech to transmit. Then in the base station to handset slot, the base station sends speech and at the end of that slot it switches to the receive mode waiting for the handset to transmit speech. Because the person at the handset is not actually speaking, the handset signals to the base station that it has not got any speech to send and the base station can use the slot. Immediately thereafter the handset switches back into the receive mode. The base station now knows that it has more time to transmit speech, and its speech encoder is switched to digitise the speech at the higher mean bit rate for transmission during the duration of the surrendered handset slot and its own slot, i.e. the segment 28 in diagram 2(ii). The sequence of events is then repeated. Eventually a stage is reached when the handset has some speech to transmit, as in segment 36 in diagram 2(iii). At the next handset to base station slot, the handset then signals that it has got some speech and wants its slot. The handset immediately continues by transmitting its own speech, this time at the lower mean bit rate and with time-compression. The base station on recognising this situation has to change its digitizing rate to allow for expanding and demodulating the speech signal from the handset as well as for digitising its own valid speech signal at the lower bit rate. Thus a situation exists where the handset and base station are both transmitting speech in alternate packets comprising half rate digitised speech which has been time-compressed and both of them, at the beginning of their segments, are signalling that they are going to use their time slots in the transmission channel. Immediately after one person stops talking the situation reverts to one where that person's apparatus signals that it does not want the slot and it can be used by the other person. In the transmission of alternate packets of digitised speech the overall delay incurred is 1 ms or half a segment, which is compatible with PSTN requirements.

Typically the segments 20, 21, 22 and so on are 2 ms long, and in the event of a person commencing to talk say half-way through a segment then that fraction of the conversation will be lost. That will not be noticed, but one has to be careful at what point the quantisation of the original user is changed. To avoid difficulty it is necessary to ensure that there is sufficient speech stored in memories in each apparatus so one has some flexibility in the time of switching the digitizing rate. Providing a delay in the system by the use of such memories is no problem, but it may require providing echo cancellers. Echo cancellers may be mandatory when using segments of 2 ms or longer.

Figure 3:
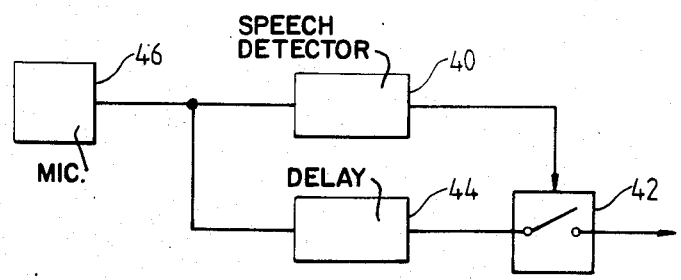
FIG. 3 is a block schematic circuit diagram of the signal input section to a transmitter in a system operating in accordance with FIG. 2.

Each apparatus includes a speech detector 40 (FIG. 3). In order to provide adequate time for the detector 40 to produce an output which controls a quantization rate switching device 42, a delay device 44 is connected to the speech microphone 46 and the switching contact of the switching device 42. The time delay produced by delay 44 is equivalent to the reaction time of the speech detector 40, so that the speech is delayed until the output of the detector 40 actuates switching device 42.

Figures 4, 4A:
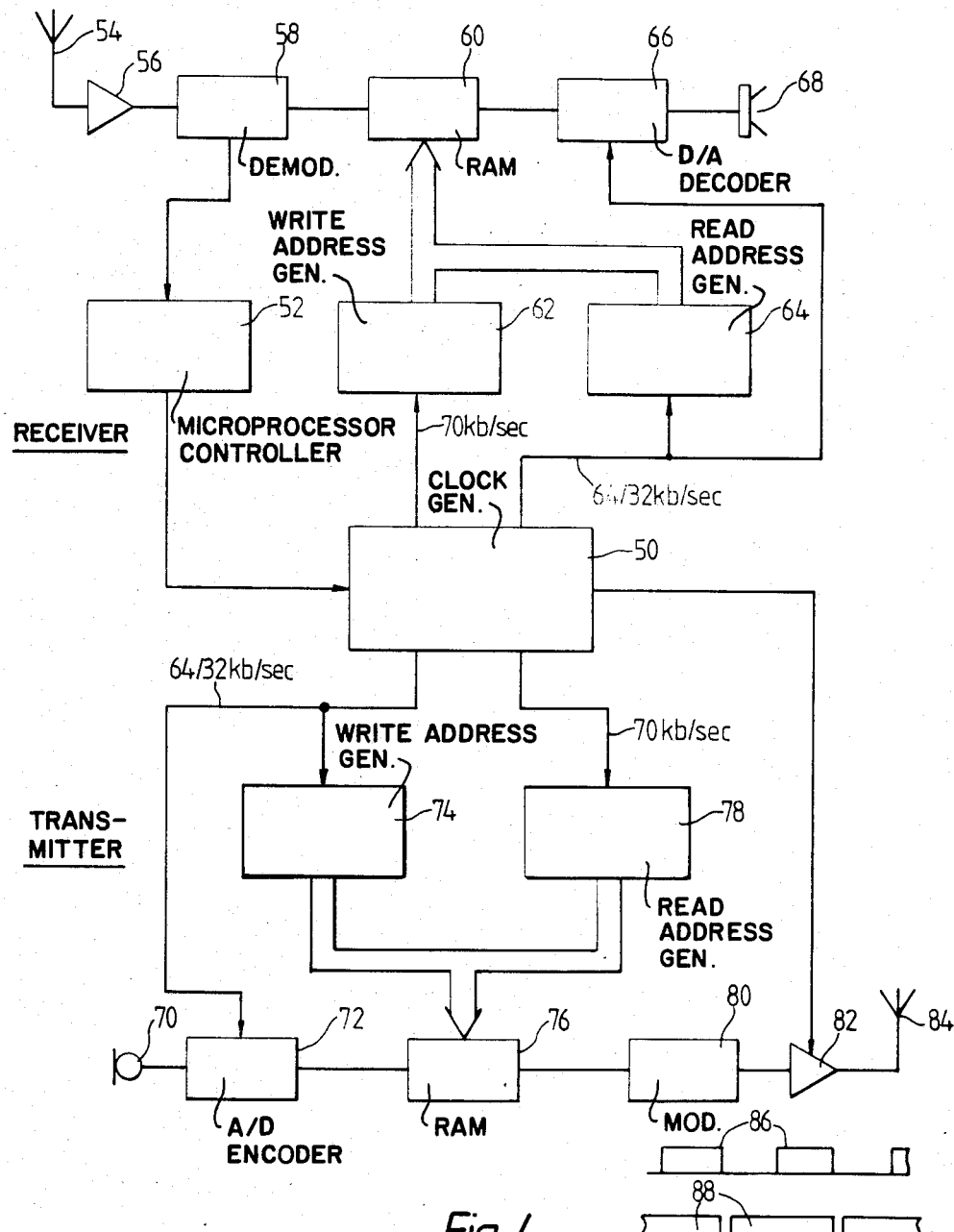
FIG. 4 is a block schematic circuit diagram of a transceiver in accordance with the present invention.
FIG. 4a illustrates the speech time segments in such a transceiver.

The transceiver shown in FIG. 4 effectively comprises a receiver and a complementary transmitter having a master clock generator 50 which is controlled in response to signals from a controller 52 which may be a suitably programmed microprocessor.

The receiver comprises an antenna 54 which is coupled to an r.f. amplifier 56 whose output is coupled to a demodulator 58. The demodulator 58 determines the signalling information, e.g. whether or not valid speech is to be sent, which is passed to the controller 52. An appropriate control signal is then applied to the clock generator 50.

The digitised information from the demodulator 58 is stored in a RAM 60 at locations determined by a write address generator 62 which is clocked at 70 kbits per second. The reading out of the RAM 60 is controlled by a read address generator 64. The rate of reading out will either be at 32 kbits/second if the speech/information has been time-compressed or at 64 kbits/second if the speech/information has been digitised at the higher mean bit rate. The speech read-out from the RAM 60 is passed to a suitable D/A decoder 66 such as an adaptive delta-demodulator or an adaptive differential PCM demodulator and the analogue output is supplied to a suitable transducer 68.

The transmitter comprises a microphone 70 whose output is supplied to a suitable A/D encoder 72 for example an adaptive delta modulator or an adaptive differential PCM which is clocked at a rate which is determined by the controller 52 in response to whether the transceiver at the other end of the link has valid speech to send. Whichever clock rate is decided upon this is also supplied to a write address generator 74 which controls the storing of the digitised speech/information in a RAM 76. The reading-out of the RAM 76 is controlled by a read address generator 78 which is clocked at 70 kbits/sec. The digitised speech is then applied to a modulator 80 and then to a power amplifier 82. An antenna 84 is coupled to the amplifier 82. If the speech/information has been digitised at the lower bit rate then it will be transmitted in packets 86 having a 1:1 mark/space ratio, as shown in FIG. 4a. However, if the higher bit rate is used, then the speech/information will be transmitted in the packets 88 which occupy most of the 2 ms segment in the transmission channel.

Although the described embodiment uses mean bit rates of 64 kbits/sec. and 32 kbits/sec. other bit rates may be used; for example a high rate of 32 kbits/sec. and a low rate of 16 kbits/sec. when bandwidth of the transmission channel is limited to only 40 kbits/sec.

Further, although differential encoding has been described in the embodiment of the present invention other forms of encoding may be used such as PCM.

The signalling by the handset or base station indicating that it has speech to send may be carried out during the previous time slot, rather than at the beginning of their allocated time slot to ensure that the correct quantisation rate will be known without undue delay.

I claim:

1. A method of duplex speech transmission wherein a limited bandwidth transmission channel is divided into a plurality of successive time slots, alternate time slots being allocated to speech from each of two parties; segments of speech are digitised and stored at a higher mean bit rate if only one party is speaking at any instant, each higher mean bit rate digitised speech segment being transmitted within the duration of two successive time slots; and segments of speech are digitised and stored at a lower mean bit rate if both parties are speaking in successive time slots, packets of such lower mean bit rate digitised speech segments from both parties being time-compressed and applied to the transmission channel during respective alternate time slots.

2. A method as claimed in claim 1 wherein the speech signal from each party is divided into segments and each party signals to the other party whether speech is to be sent in the timeslot associated with a speech segment of the signalling party and the mean bit rate for digitising and storing the speech segment of the other party during that time slot is determined in response to the signal received from the signalling party.

3. A method as claimed in claim 1, wherein each speech segment and its associated time slot terminate substantially simultaneously.

4. A method of duplex speech transmission wherein a limited bandwidth transmission channel is divided into a plurality of successive time slots, alternate time slots being allocated to speech from each of two parties; speech signals from each of the parties are divided into time segments with the time segments associated with either party being offset in time with respect to the time segments associated with the other party; segments of speech when present are digitised and stored, a higher digitizing rate being used when speech is present in the time segment of one party and not in the time segment of the other party, said higher rate digitized signal being transmitted in the other party's time slot and the immediately following time slot of said one party, and a lower digitizing rate being used when both parties have speech in their respective time segments, the lower rate digitized signals being time compressed and transmitted in their associated time slots; and wherein the end of any time segment coincides substantially with the end of the time slot associated with said time segment.

5. A duplex communication system for use on a limited bandwidth transmission channel which is divided into a plurality of succesive time slots, alternate time slots being allocated to each of two transceivers for transmission of speech between such transceivers; each such transceiver comprising: means for detecting if speech is to be transmitted by such transceiver in a time slot allocated to such transceiver and for signalling accordingly to the other transceiver; means for digitising and storing segments of speech to be transmitted; control means for determining if the other transceiver has signalled that it has a segment of speech to transmit in its time slot and, in response to determining that other transceiver does not have such a segment in such time slot, controlling the digitising means to digitise its speech segment at a higher mean bit rate and to transmit it in two successive timeslots; such control means being further adapted, in response to determining that both transceivers have speech segments for simultaneous transmission, to control the digitising means to digitize and store such speech segments at a lower mean bit rate; and means for time-compressing speech segments which have been digitised at the lower mean bit rate and transmitting the digitised speech segments in respective time slots.

6. A system as claimed in claim 5, wherein said digitizing means comprises an adaptive delta modulator.

7. A system as claimed in claim 5, wherein said digitizing means comprises an adaptive differential PCM.

8. A system as claimed in claim 5, wherein each of said transceivers is a cordless telephone.

* * * * *